United States Patent
Larson et al.

(12) 
(10) Patent No.: US 9,497,570 B2
(45) Date of Patent: Nov. 15, 2016

(54) EMBEDDED WIRELESS MODEM

(71) Applicant: NimbeLink L.L.C., Plymouth, MN (US)

(72) Inventors: Kurt T. Larson, Plymouth, MN (US); Christopher J. Elmquist, Mahtomedi, MN (US)

(73) Assignee: NIMBELINK CORP., Plymouth, MN (US)

( * ) Notice: Subject to any disclaimer, the term of this patent is extended or adjusted under 35 U.S.C. 154(b) by 0 days.

(21) Appl. No.: 14/616,118

(22) Filed: Feb. 6, 2015

(65) Prior Publication Data

US 2015/0256212 A1   Sep. 10, 2015

Related U.S. Application Data

(60) Provisional application No. 61/936,615, filed on Feb. 6, 2014.

(51) Int. Cl.
*H04W 4/00* (2009.01)

(52) U.S. Cl.
CPC .................... *H04W 4/005* (2013.01)

(58) Field of Classification Search
CPC ............... H04L 12/2898; H04M 2215/2086; H04M 3/304; H04Q 2213/13199; H04Q 2213/199
See application file for complete search history.

(56) References Cited

U.S. PATENT DOCUMENTS

| | | |
|---|---|---|
| D206,327 S | 11/1966 | Keys |
| 3,602,846 A | 8/1971 | Hauser |
| 3,762,039 A | 10/1973 | Douglass et al. |
| 3,825,876 A | 7/1974 | Damon et al. |
| 3,846,734 A | 11/1974 | Pauza et al. |
| 4,218,724 A | 8/1980 | Kaufman |
| D260,091 S | 8/1981 | Mochizuki et al. |
| D261,760 S | 11/1981 | Dlugos |
| D286,053 S | 10/1986 | McDaniel et al. |
| 4,630,174 A | 12/1986 | Kaufman |
| D288,557 S | 3/1987 | Du Bois |
| D288,922 S | 3/1987 | Olla |
| 4,663,833 A | 5/1987 | Tanaka et al. |
| D316,848 S | 5/1991 | Hasegawa et al. |
| D317,300 S | 6/1991 | Hasegawa et al. |
| D318,271 S | 7/1991 | Hasegawa et al. |
| D320,212 S | 9/1991 | Someya |
| 5,221,859 A | 6/1993 | Kobayashi et al. |
| D345,731 S | 4/1994 | Owens et al. |
| 5,369,551 A | 11/1994 | Gore et al. |

(Continued)

FOREIGN PATENT DOCUMENTS

HK   EP 2182643 A2 * 5/2010 ........... H04B 1/3827

*Primary Examiner* — Lewis West
(74) *Attorney, Agent, or Firm* — Christensen Fonder P.A.

(57) ABSTRACT

A space-efficient cellular modem device for machine-to-machine communications that includes: a multi-layer printed circuit board defining a top side and a bottom side and including a first circuit layer adjacent the top side, a second circuit layer adjacent the bottom side, a ground plane layer, and a power plane layer, the ground and power plane layers located between the first and second circuit layers; a cellular transceiver module configured to communicate over a cellular wireless cellular network; electrical power-management components attached to the multi-layer printed circuit board, the power-management components in electrical communication with the cellular transceiver module; first and second rows of pins in electrical communication with the cellular transceiver; and a communications port.

20 Claims, 21 Drawing Sheets

(56) References Cited

U.S. PATENT DOCUMENTS

| | | |
|---|---|---|
| D357,462 S | 4/1995 | Terasawa et al. |
| D357,671 S | 4/1995 | Terasawa et al. |
| D357,672 S | 4/1995 | Terasawa et al. |
| D358,805 S | 5/1995 | Siegel et al. |
| D360,619 S | 7/1995 | Terasawa et al. |
| 5,434,357 A | 7/1995 | Belcher et al. |
| 5,444,297 A | 8/1995 | Oshima et al. |
| D364,399 S | 11/1995 | Long |
| 5,552,631 A | 9/1996 | McCormick |
| 5,635,670 A | 6/1997 | Kubota et al. |
| D389,808 S | 1/1998 | Yamada et al. |
| 5,757,070 A | 5/1998 | Fritz |
| D396,450 S | 7/1998 | Nishiura et al. |
| D396,471 S | 7/1998 | Kolinen |
| D396,846 S | 8/1998 | Nakayama et al. |
| D396,847 S | 8/1998 | Nakayama et al. |
| 5,798,570 A | 8/1998 | Watanabe et al. |
| D401,912 S | 12/1998 | Majumdar et al. |
| 5,844,307 A | 12/1998 | Suzuki et al. |
| 5,959,846 A | 9/1999 | Noguchi et al. |
| D416,872 S | 11/1999 | Burke |
| 5,998,242 A | 12/1999 | Kirkpatrick et al. |
| D418,485 S | 1/2000 | Kawafuji et al. |
| D421,969 S | 3/2000 | Kawafuji et al. |
| D432,097 S | 10/2000 | Song et al. |
| 6,166,430 A | 12/2000 | Yamaguchi |
| D442,171 S | 5/2001 | Jang |
| D444,132 S | 6/2001 | Iwanishi et al. |
| D448,739 S | 10/2001 | Iwasaki et al. |
| D453,746 S | 2/2002 | Kato et al. |
| 6,358,776 B1 | 3/2002 | Takehara et al. |
| D459,705 S | 7/2002 | Yokota et al. |
| D466,485 S | 12/2002 | Maehara et al. |
| D466,873 S | 12/2002 | Kasem et al. |
| D470,463 S | 2/2003 | Iwasaki et al. |
| D470,825 S | 2/2003 | Iwasaki et al. |
| 6,521,983 B1 | 2/2003 | Yoshimatsu et al. |
| D472,528 S | 4/2003 | Kasem et al. |
| D472,547 S | 4/2003 | Dendou et al. |
| D476,959 S | 7/2003 | Yamada et al. |
| D476,962 S | 7/2003 | Yoshihira et al. |
| D489,338 S | 5/2004 | Seddon et al. |
| D502,684 S | 3/2005 | Koshiishi |
| D505,399 S | 5/2005 | Yoshida et al. |
| D505,400 S | 5/2005 | Kawafuji et al. |
| D507,544 S | 7/2005 | Wang et al. |
| D510,728 S | 10/2005 | Celaya et al. |
| D515,046 S | 2/2006 | Kaprelian |
| 6,995,461 B2 | 2/2006 | Soyano et al. |
| D530,316 S | 10/2006 | Hsu et al. |
| 7,130,942 B2 | 10/2006 | Gemelli et al. |
| 7,166,496 B1 | 1/2007 | Lopez et al. |
| D548,203 S | 8/2007 | Takahashi |
| D550,172 S | 9/2007 | Aguilar |
| 7,299,427 B2 | 11/2007 | Settles |
| D564,502 S | 3/2008 | Johnson et al. |
| 7,425,757 B2 | 9/2008 | Takubo |
| D590,827 S | 4/2009 | Song |
| D594,827 S | 6/2009 | Loh et al. |
| D606,951 S | 12/2009 | Soyano et al. |
| 7,706,146 B2 | 4/2010 | Lee et al. |
| 7,868,451 B2 | 1/2011 | Muramatsu et al. |
| 7,881,457 B1 | 2/2011 | Chen et al. |
| D635,106 S | 3/2011 | Cheng et al. |
| 8,049,312 B2 | 11/2011 | Herbsommer et al. |
| 8,093,692 B2 | 1/2012 | Obara |
| 8,102,655 B2 | 1/2012 | Sakamoto et al. |
| 8,107,255 B2 | 1/2012 | Sakamoto et al. |
| D653,634 S | 2/2012 | Soyano |
| D655,697 S | 3/2012 | Petsch |
| D664,544 S | 7/2012 | Yi et al. |
| D673,921 S | 1/2013 | Ozawa |
| D674,760 S | 1/2013 | Mochizuki et al. |
| D686,174 S | 7/2013 | Soyano |
| 8,494,582 B1 * | 7/2013 | Ellis .................. H04M 1/0254 455/41.2 |
| D689,446 S | 9/2013 | Soyano |
| D696,653 S | 12/2013 | Ohashi et al. |
| D705,184 S | 5/2014 | Takahashi et al. |
| D706,232 S | 6/2014 | Nakamura |
| D706,249 S | 6/2014 | Holzer |
| D715,234 S | 10/2014 | Chan et al. |
| D717,254 S | 11/2014 | Jo et al. |
| D719,115 S | 12/2014 | Liu et al. |
| D719,537 S | 12/2014 | Kawase et al. |
| D719,926 S | 12/2014 | Sohn et al. |
| D731,491 S | 6/2015 | Larson et al. |
| 2003/0042584 A1 | 3/2003 | Yamaguchi |
| 2003/0192949 A1 | 10/2003 | Hattersley et al. |
| 2006/0041919 A1 | 2/2006 | Tokunaga et al. |
| 2008/0155630 A1 | 6/2008 | Oosawa |
| 2008/0160931 A1 * | 7/2008 | Rofougaran ............ H01L 23/66 455/90.3 |
| 2010/0149774 A1 | 6/2010 | Matsumoto et al. |
| 2011/0298137 A1 | 12/2011 | Pagaila et al. |
| 2013/0088251 A1 | 4/2013 | Choi et al. |
| 2013/0316762 A1 * | 11/2013 | Charbit ............... H04W 76/023 455/552.1 |
| 2014/0001651 A1 | 1/2014 | Nickerson et al. |
| 2014/0001652 A1 | 1/2014 | Chen et al. |
| 2014/0008776 A1 | 1/2014 | Soller |
| 2014/0061950 A1 | 3/2014 | Zhai |
| 2014/0084478 A1 | 3/2014 | Simion |
| 2014/0091461 A1 | 4/2014 | Shen |
| 2014/0110820 A1 | 4/2014 | Standing et al. |
| 2014/0113460 A1 | 4/2014 | Park et al. |
| 2014/0119690 A1 | 5/2014 | Matsumoto et al. |
| 2014/0131854 A1 | 5/2014 | Hawk et al. |
| 2014/0140657 A1 | 5/2014 | Shiraishi |
| 2014/0177997 A1 | 6/2014 | Huang |
| 2014/0270626 A1 | 9/2014 | Isenhour et al. |
| 2014/0270629 A1 | 9/2014 | Dutt et al. |
| 2014/0270630 A1 | 9/2014 | Kropp |
| 2014/0274015 A1 * | 9/2014 | Regan ............... H04W 1/72525 455/418 |
| 2014/0321807 A1 | 10/2014 | Sakai et al. |
| 2014/0348462 A1 | 11/2014 | Yabre |
| 2015/0003775 A1 | 1/2015 | Saado |
| 2015/0023632 A1 | 1/2015 | Lan et al. |
| 2015/0030281 A1 | 1/2015 | Chan et al. |
| 2015/0036970 A1 | 2/2015 | Lai et al. |

* cited by examiner

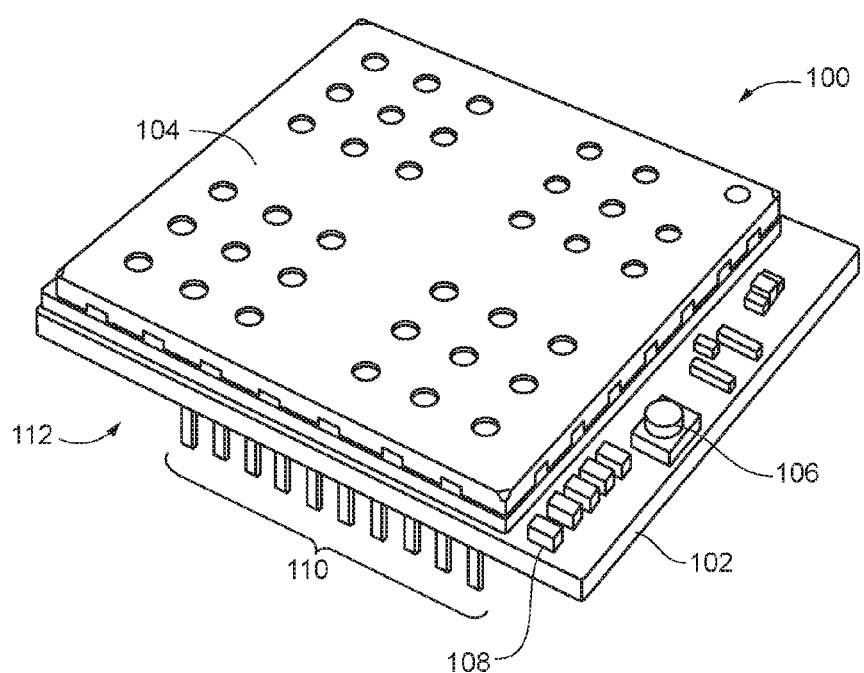

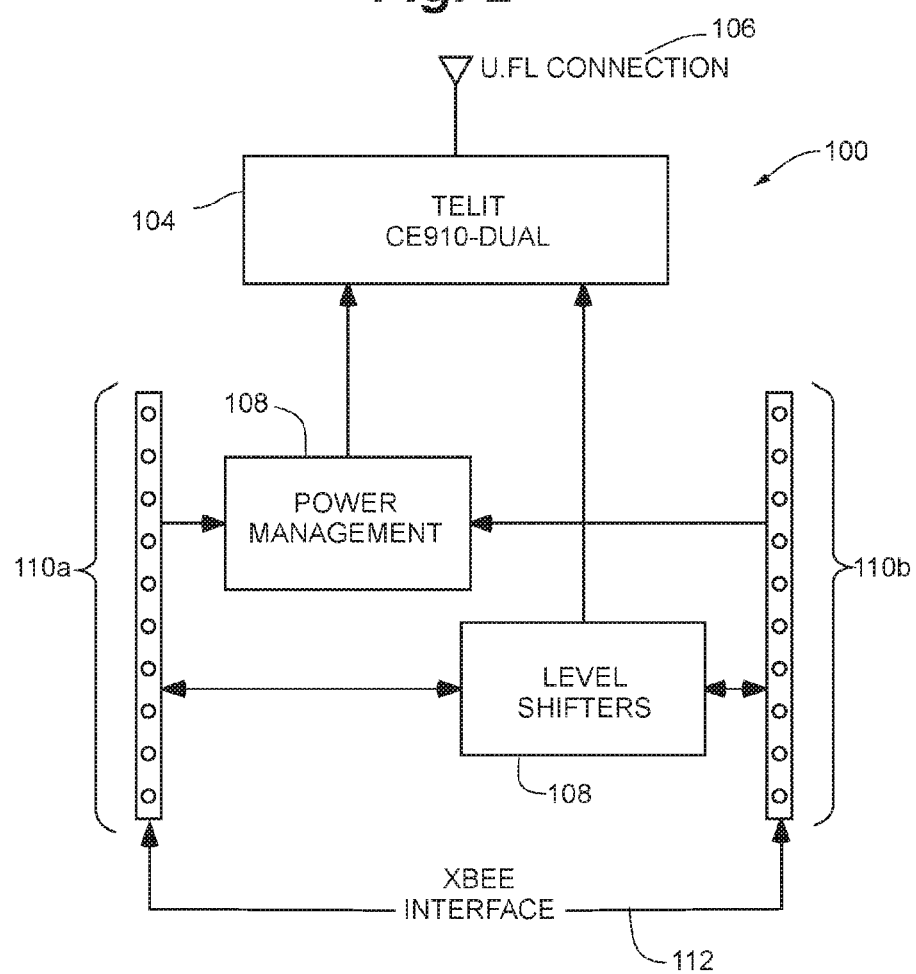

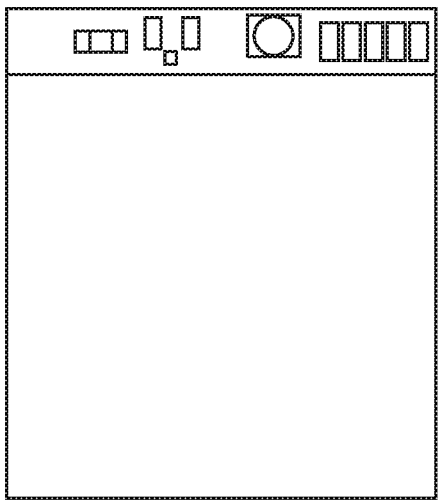
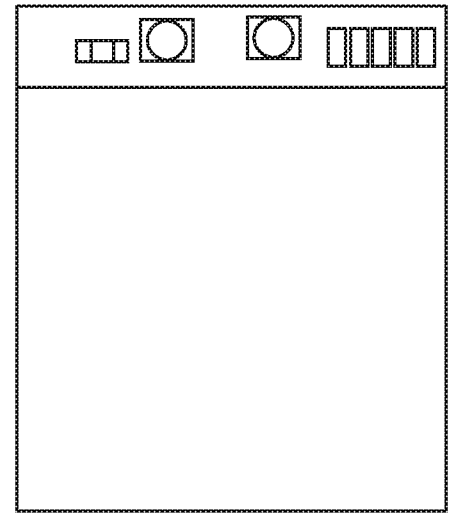
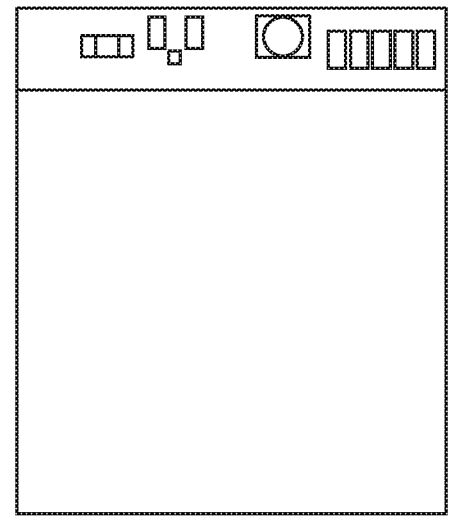

EMBEDDED WIRELESS MODEM

RELATED APPLICATIONS

The present application claims the benefit of U.S. Provisional Application No. 61/936,651 filed Feb. 6, 2014, which is incorporated herein in its entirety by reference.

FIELD OF THE INVENTION

The present invention is generally directed to embedded wireless modems. More specifically, the present invention is directed to improved, space-efficient embedded cellular modems for machine-to-machine communication.

BACKGROUND OF THE INVENTION

Wireless modems, and in particular, cellular modems, may be embedded in remotely-located machines such as meters, automatic teller machines (ATMs), temperature monitors, and so on, to enable wireless communication between the remotely-located "machine" and another "machine", such as a computer server. Such machine-to-machine (M2M) communications facilitate remote monitoring of devices, including data collection, in a number of applications and industries, including agriculture, security, oil and gas, property management, and so on.

While the use of embedded cellular modems in such M2M applications is generally known, presently-used modems remain relatively expensive, typically require a large footprint and may not be designed to be integrated with the latest standards of technology.

SUMMARY OF THE INVENTION

Embodiments of the invention comprise various space-efficient, embedded cellular modems for use in M2M applications. In an embodiment, cellular modems of the invention include a cellular transceiver module, U.FL antenna port, power management electronics, level shifter electronics, and an interface, all in an XBee® form factor. The embedded cellular modem may be configured to operate on a CDMA, GSM, or other cellular network.

Embedded cellular modems of the invention add robust cellular connectivity to M2M devices, and in the case of pre-certified modems, avoid the cost, delay and hassle of obtaining federal and carrier certifications. In an embodiment, modems of the invention comply with the XBee interface standard, optimized for 1×RTT, or other cellular networks, thereby minimizing costs of hardware and network access.

Other embodiments of the invention include embedded cellular modem kits which include an embedded cellular modem, baseboard, antenna, communications cable, and power supply.

An embodiment comprises a space-efficient cellular modem device for machine-to-machine communications that includes: a multi-layer printed circuit board defining a top side and a bottom side and including a first circuit layer adjacent the top side, a second circuit layer adjacent the bottom side, a ground plane layer, and a power plane layer, the ground and power plane layers located between the first and second circuit layers; a cellular transceiver module configured to communicate over a cellular wireless cellular network, the cellular transceiver module comprising a processor and attached to a top side of the multi-layer printed circuit board; electrical power-management components attached to the multi-layer printed circuit board, the power-management components in electrical communication with the cellular transceiver module; a first plurality of electrically-conductive pins in electrical connection with the cellular transceiver module and aligned along a first pin axis to form a first row of pins, each of the first plurality of pins extending outwardly and away from the bottom side of the multi-layer printed circuit board; a second plurality of electrically-conductive pins in electrical connection with the cellular transceiver module and aligned along a second pin axis to form a second row of pins, each of the second plurality of pins extending outwardly and away from the bottom side of the multi-layer printed circuit board a communications port, the second row of pins located opposite the first row of pins; and a communications port in electrical communication with the cellular transceiver module, the communications port configured to receive and transmit communication signals over the cellular wireless network.

Another embodiment comprises a space-efficient cellular modem device for machine-to-machine communications that includes: a multi-layer printed circuit board defining a top side and a bottom side and including a circuit layer, a ground plane layer and a power plane layer, the top side of the multi-layer printed circuit board defining a top-side surface area; a cellular transceiver module configured to communicate over a cellular wireless cellular network, the cellular transceiver module comprising a housing defining a top-side surface area and attached to a top side of the multi-layer printed circuit board, the top-side surface area of the cellular transceiver module being in a range of 50% to 100% of the top-side surface area of the multi-layer printed circuit board; electrical power-management components attached to the multi-layer printed circuit board, the power-management components in electrical communication with the cellular transceiver module; a first row of electrically-conductive pins in electrical connection with the cellular transceiver module, each of the pins extending outwardly and away from the bottom side of the multi-layer printed circuit board; a second row of electrically-conductive pins in electrical connection with the cellular transceiver module, each of the pins extending outwardly and away from the bottom side of the multi-layer printed circuit board; an antenna port in electrical communication with the cellular transceiver module, the communications port configured to receive and transmit communication signals over the cellular wireless network.

BRIEF DESCRIPTION OF THE FIGURES

The invention can be understood in consideration of the following detailed description of various embodiments of the invention in connection with the accompanying drawings, in which:

FIG. 1 depicts an embodiment of an embedded cellular modem, according to an embodiment of the invention;

FIG. 2 depicts a block diagram of the embedded cellular modem of FIG. 1;

FIGS. 11a-11g depict various view of the embedded cellular modem of FIG. 1;

FIGS. 12a-g depict various views of the embedded cellular modem of FIG. 7;

FIGS. 13a-g depict various views of the embedded cellular modem of FIG. 9;

Figure 3A:
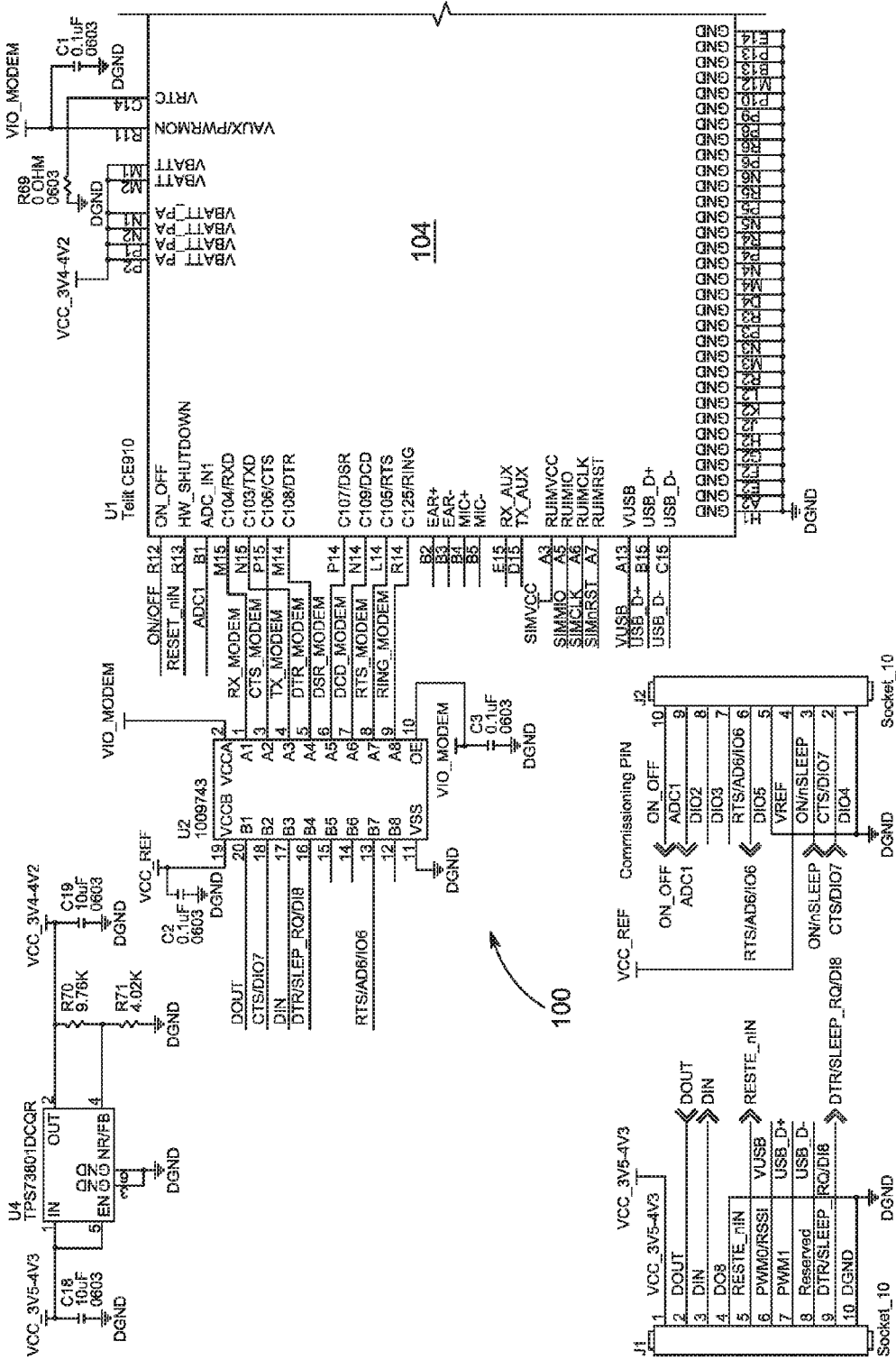
FIGS. 3a and 3b depict a circuit diagram of the embedded cellular modem of FIGS. 1 and 2.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring to FIGS. 1-3b, an embodiment of an embedded cellular modem 100 is depicted. In an embodiment, cellular modem 100 includes printed-circuit (PC) board 102, cellular transceiver module 104, communication port 106, which may comprise an antenna port 106, power management and level shifter electronics 108, pin connectors 110 and interface 112.

As will be described further below, in an embodiment, PC board 102 may comprise a multi-layer board having multiple sub-boards electrically connected by inter-board vias.

In an embodiment cellular transceiver module 104 comprises a cellular transceiver configured to communicate over a cellular network, such as a CDMA network, including 1xRTT and EVDO networks, GSM networks, including GPRS, UMTS, HSPA+ and other cellular networks. In other embodiments, module 104 may communicate non-cellular RF networks.

In a specific embodiment, cellular transceiver module 104 comprises a Telit CE910-Dual 1xRTT communications module; in other embodiments, cellular transceiver module 104 comprises a Telit DE 910 Dual module, GE910 Quad, and LE 910 for CDMA EV-DO networks, GSM networks, and LTE networks, respectively. In an embodiment, cellular transceiver module 104 comprises a processor.

In an embodiment, antenna port 106 may comprise a U.FL antenna port configured to interface with a micro antenna cable. Although a single antenna port is depicted in FIG. 1, additional antenna ports 106 may be present, as described further below. In an embodiment, antenna port 106 may comprise an antenna port other than a U.FL antenna port. The use of micro-coaxial cables and antenna ports facilitates universal antenna options off-the-module.

Figure 3B:
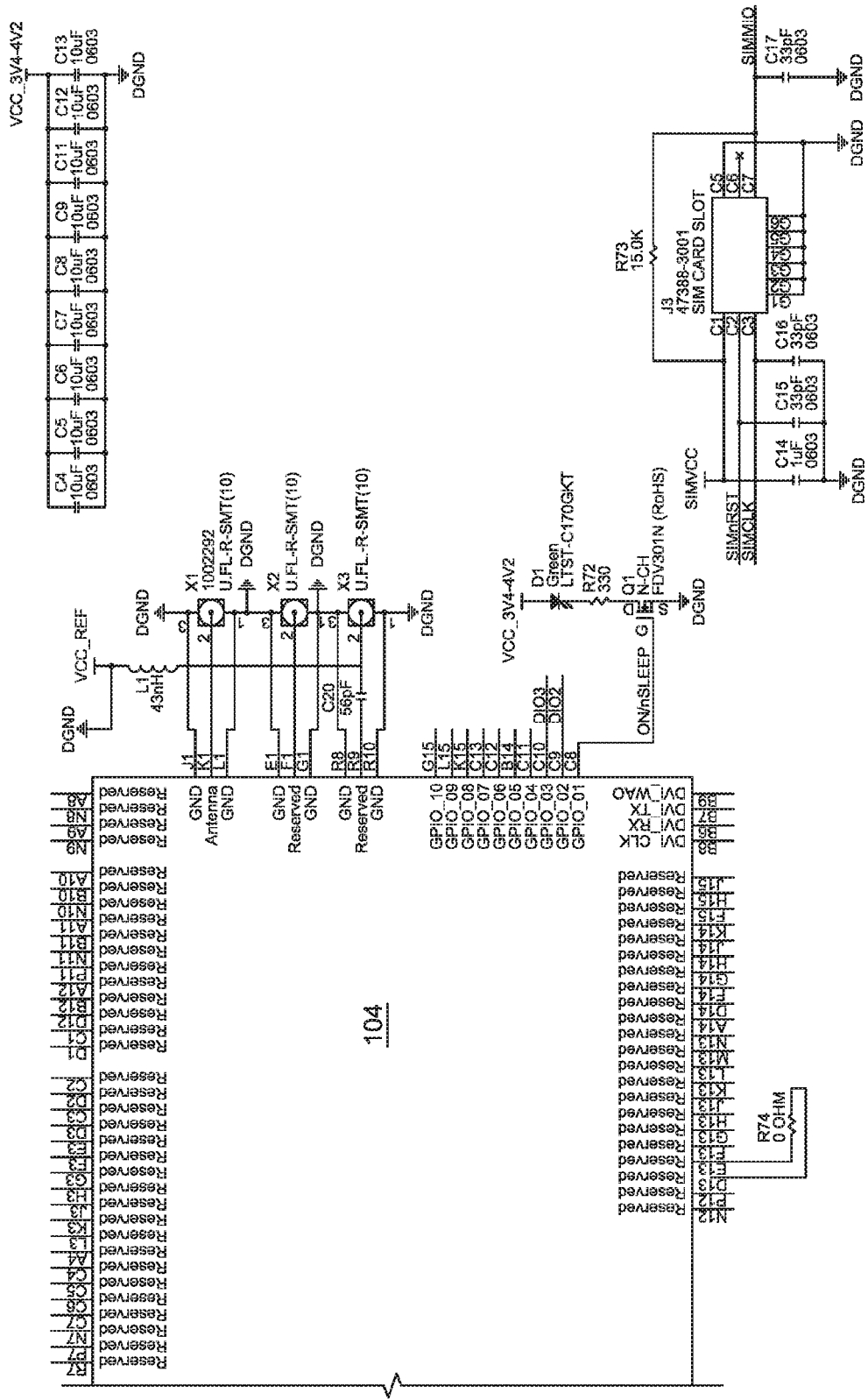

Power management and level shifter electronics 108 are located on PC board 102 and are described in further detail in FIGS. 3a and 3b, an electrical schematic of embedded cellular modem 100.

Embodiments of embedded cellular modem 100 may be configured for use in CDMA 1xRTT.

Figure 4:
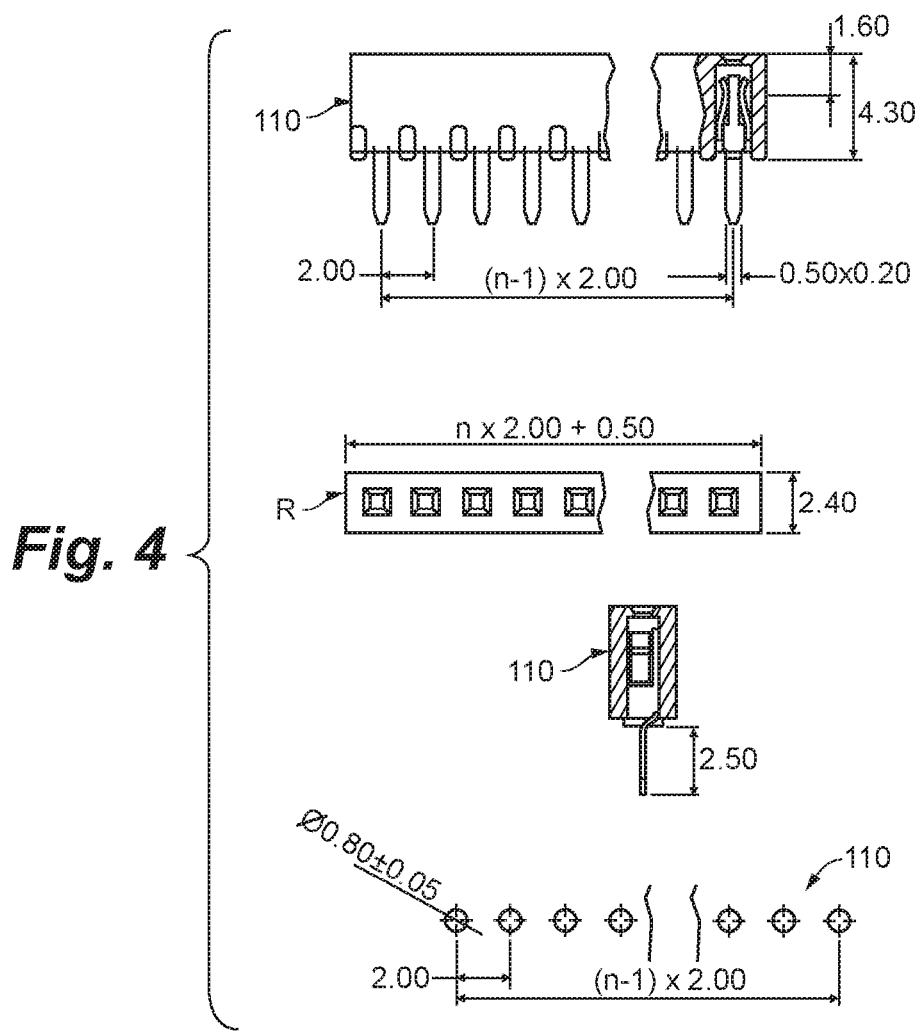
FIG. 4 depicts pin connectors and receiver of the embedded cellular modem of FIG. 1.

Referring also to FIG. 4, pin connectors 110, as depicted, may comprise two 10-pin connectors, 110a and 110b, having a 2 mm pitch, so as to comprise an XBee form factor. The ten pin connectors are configured to fit into corresponding female receptacles, such as receptacles R, depicted. In an embodiment, and as depicted, pin connectors 110 may comprise surface mount pins.

Figure 5:
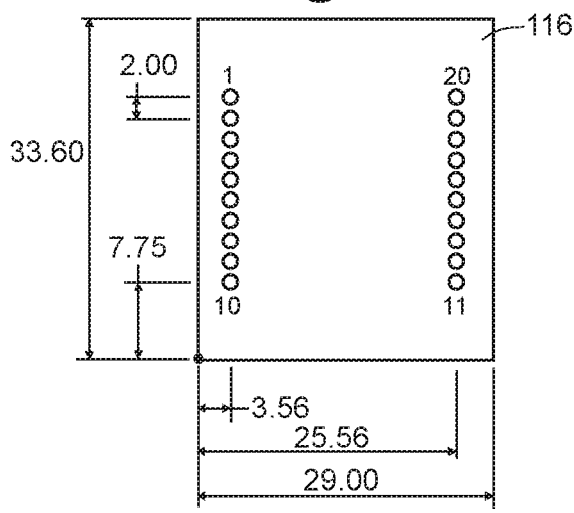
FIG. 5 depicts a base board compatible with the embedded cellular modem of FIG. 1.

Referring also to FIG. 5, pin connectors 110 may be electrically connected, such as by soldering, to base PC board 116. In an embodiment, PC board 116 defines an envelope dimension of 33.60 mm×29.00 mm, with pin connections distributed about PC board 102 as depicted.

Figure 6:
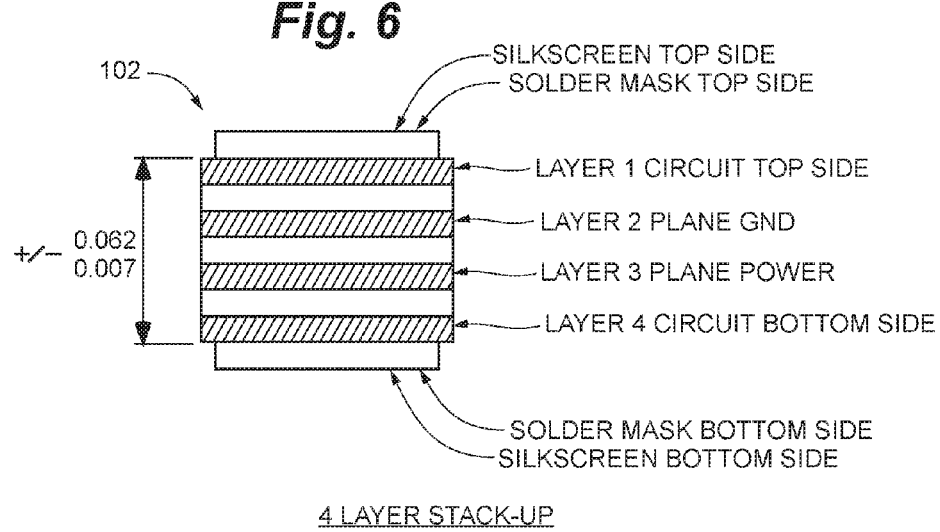
FIG. 6 depicts a multi-layer PC board assembly of the embedded cellular modem of FIG. 1.

Referring to FIG. 6, the compact, space-efficient embedded cellular modem 100 achieves the XBee form factor by utilizing a multi-layer PC board. In an embodiment, PC board 102 comprises a multi-layer PC board including a silkscreened and solder-masked top side, a first layer (Layer 1) comprising a circuit top side, a second layer (Layer 2) comprising a ground plane, a third layer (Layer 3) comprising a power plane, a fourth layer (Layer 4) comprising a circuit bottom side, and finally, a silkscreened/solder-masked bottom side.

In an embodiment, and as depicted, PC board 102 as assembled defines a height of only 0.062 in+/−0.007 in.

Such a multi-layer, or 4-layer in this embodiment, allows for efficient spacing of surface-mounted components, connectors, and interfaces for the XBee form factor.

Figure 7:
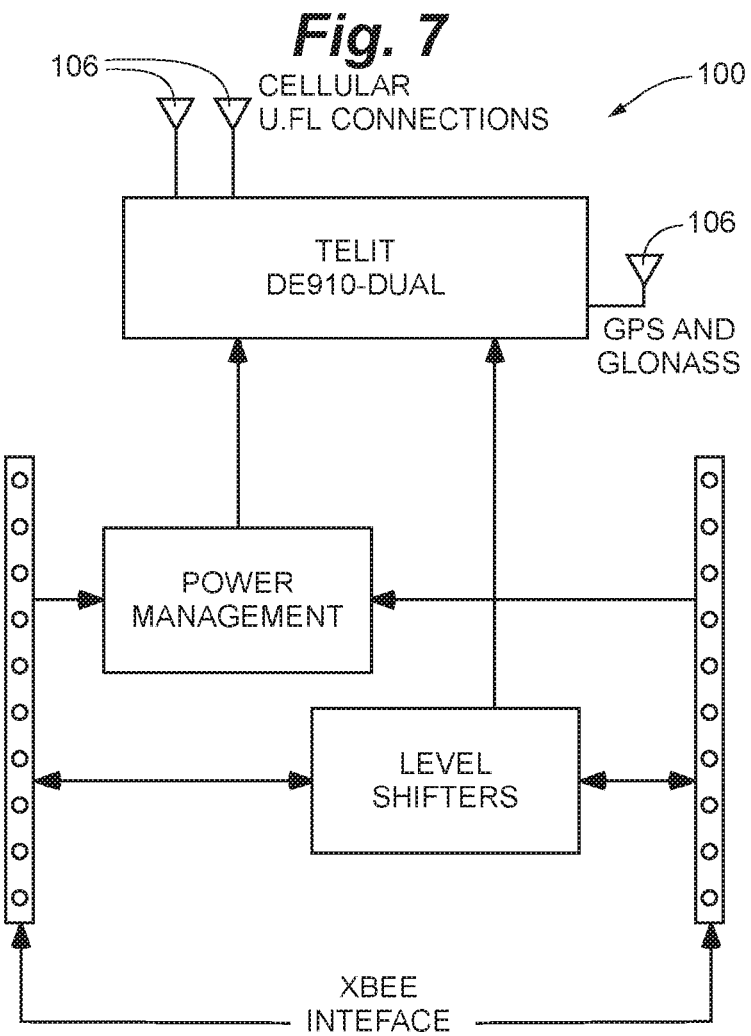
FIG. 7 depicts a CDMA EV-DO enabled embodiment of an embedded cellular modem, according to an embodiment of the invention.

Referring to FIG. 7, an embodiment of embedded cellular modem 100 configured to operate on a CDMA EV-DO network is depicted in a block diagram. In this embodiment, modem 100 includes a transceiver 104 that is configured for the EV-DO network, which in an embodiment comprises a Telit module DE910-DUAL. Further, this embodiment includes a pair of antenna ports 106. In an embodiment, three antenna ports 106, two of which are located at a top side of PC board 102, and one at a bottom side of PC board 102.

Figure 8:
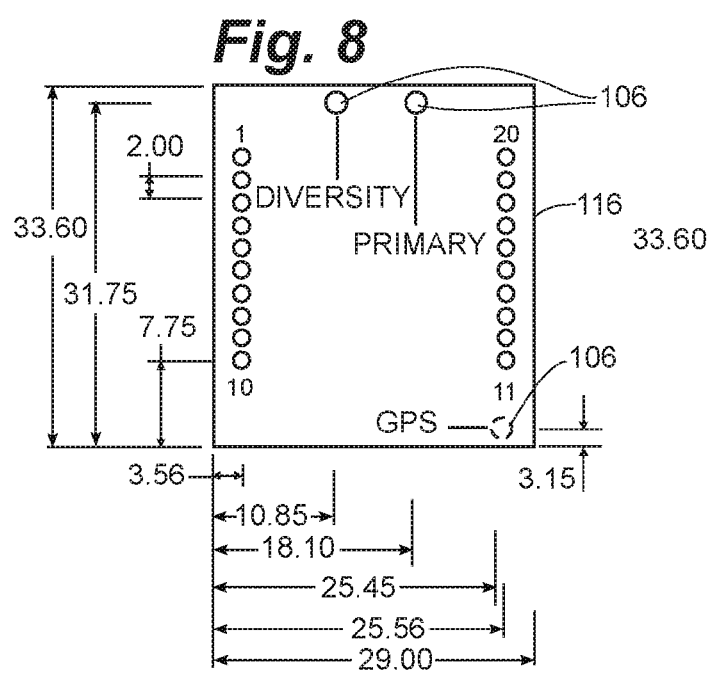
FIG. 8 depicts a PC board with connector locations of the embedded cellular modem of FIG. 7.

FIG. 8 is a mechanical drawing of PC board 102 of an EV-DO modem 100 showing locations of connectors. Such a drawing may be used to assist a designer in knowing where to align mating connectors on their baseboard as well as physical routing of RF cables inside their end product.

Figure 9:
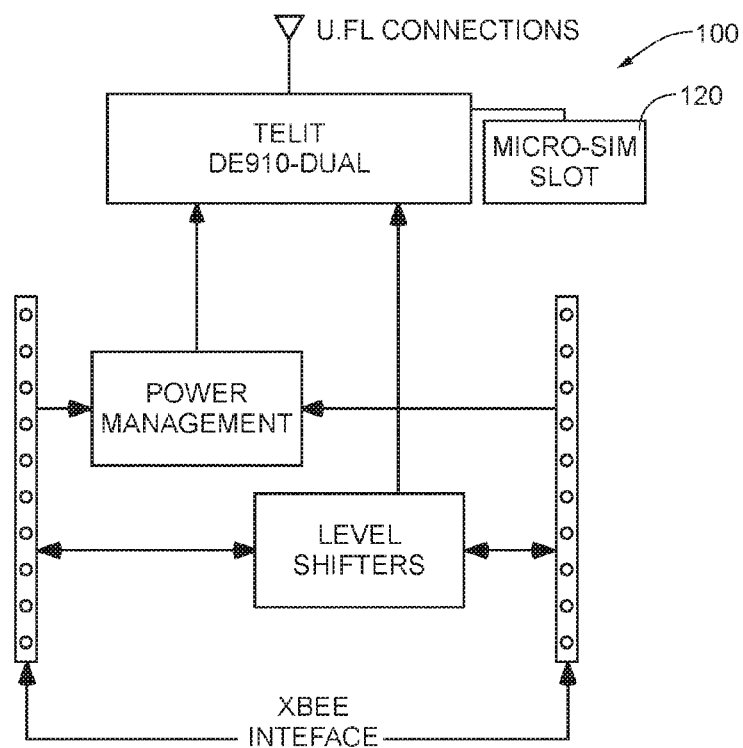
FIG. 9 depicts a GSM enabled embodiment of an embedded cellular modem, according to an embodiment of the invention.

Referring to FIG. 9, an embodiment of embedded cellular modem 100 configured to operate on a GPRS network is depicted in a block diagram. In this particular embodiment, modem 100 includes a micro-SIM slot 120. In an embodiment, micro-SIM slot 120 may be on a bottom side of PC board 120.

Figure 10:
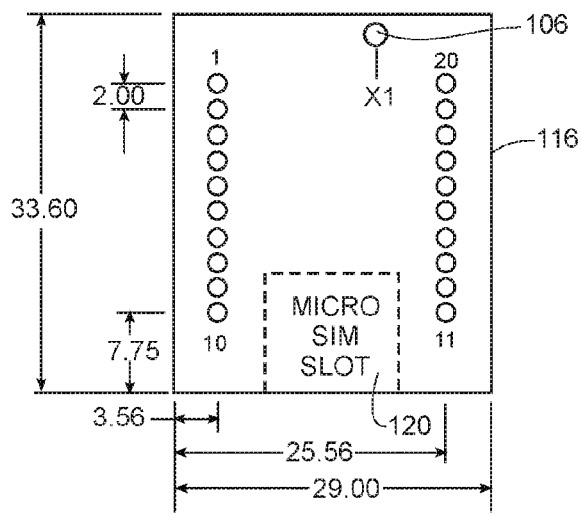
FIG. 10 depicts a PC board with connector locations of the embedded cellular modem of FIG. 9.
Figure 11A:
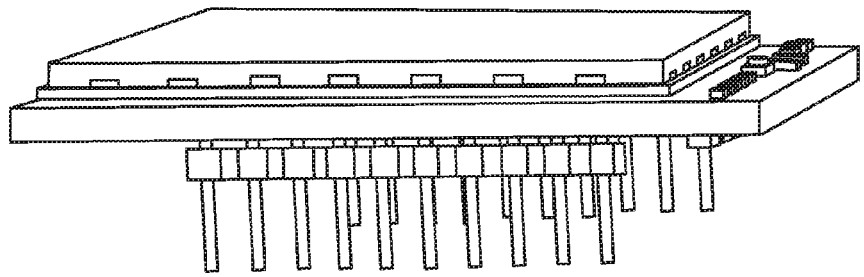
Figure 12A:
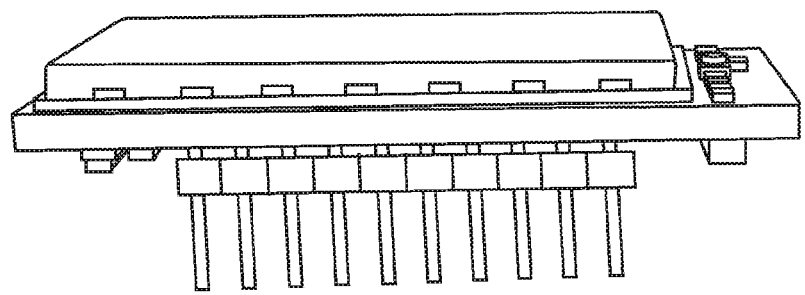
Figure 13A:
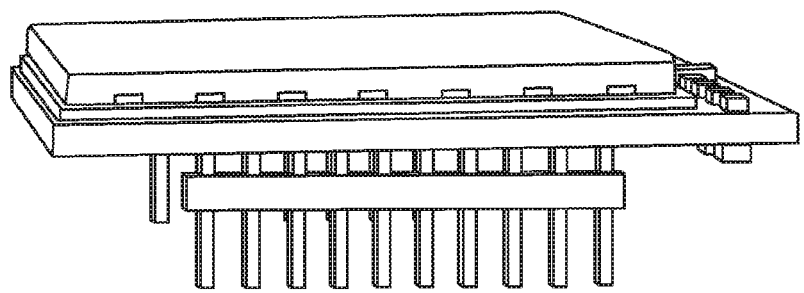
Figure 11C:
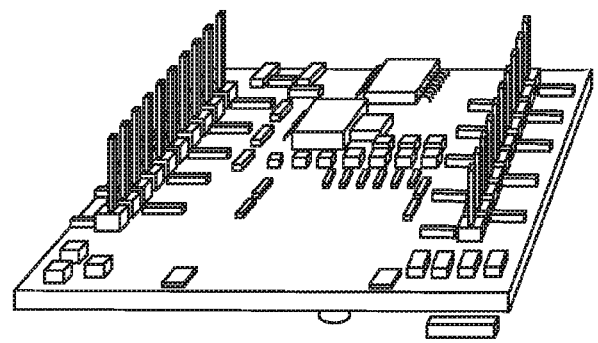
Figure 12C:
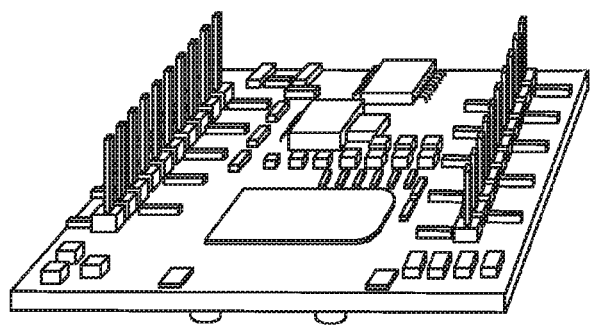
Figure 13C:
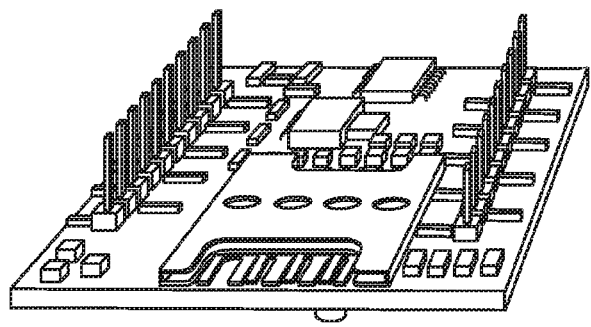
Figure 11D:
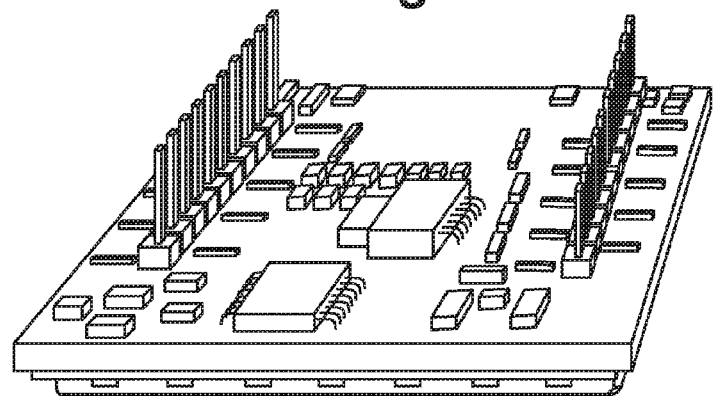
Figure 12D:
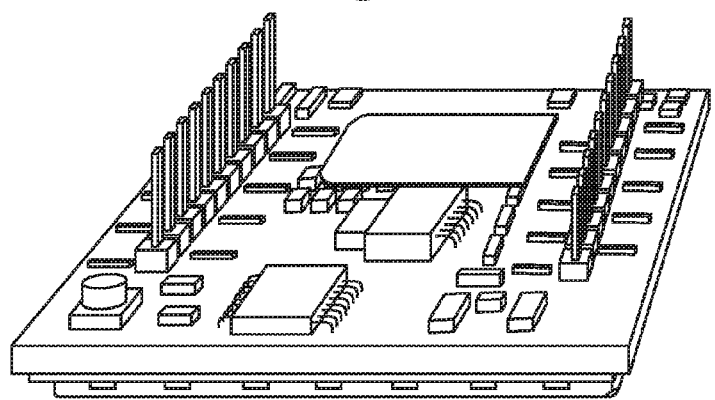
Figure 13D:
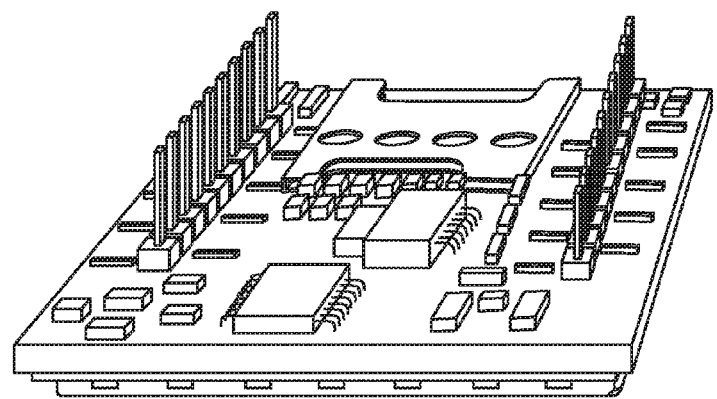
Figure 11E:
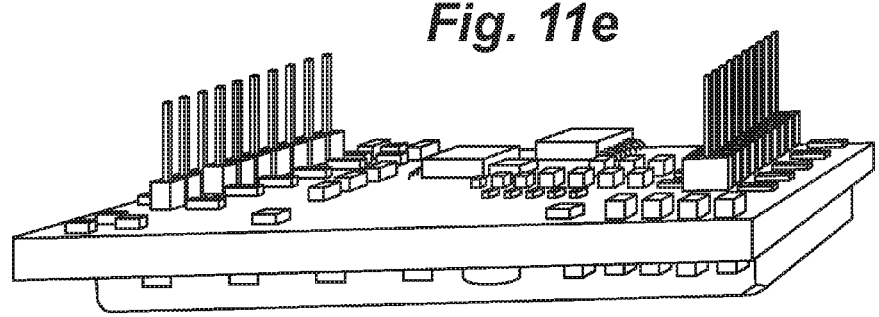
Figure 12E:
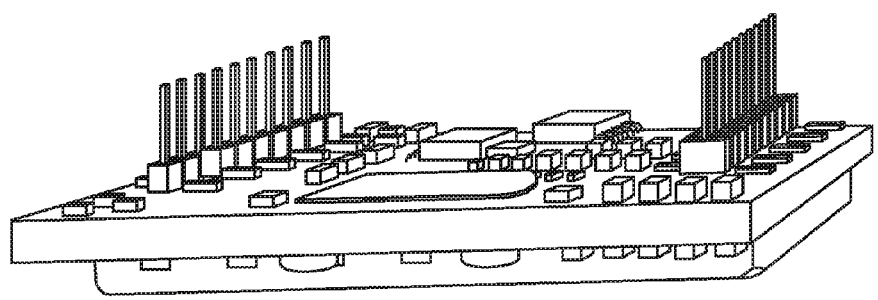
Figure 13E:
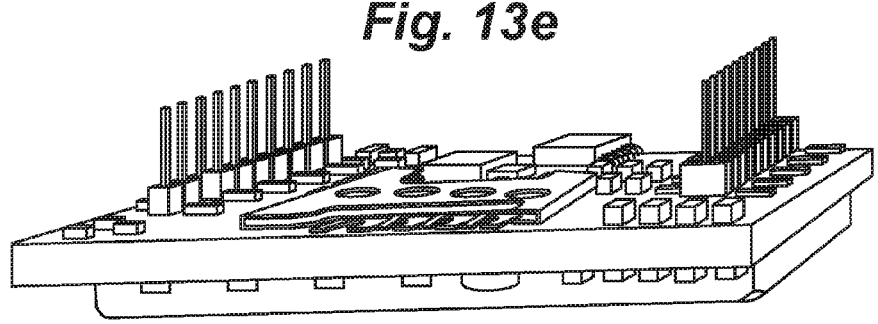
Figure 11F:
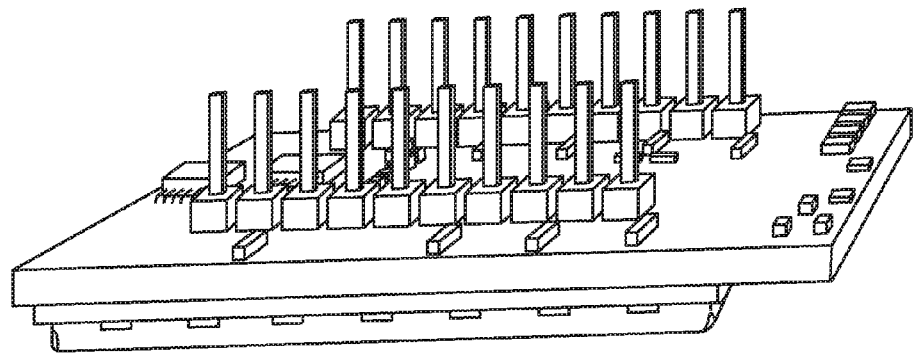
Figure 12F:
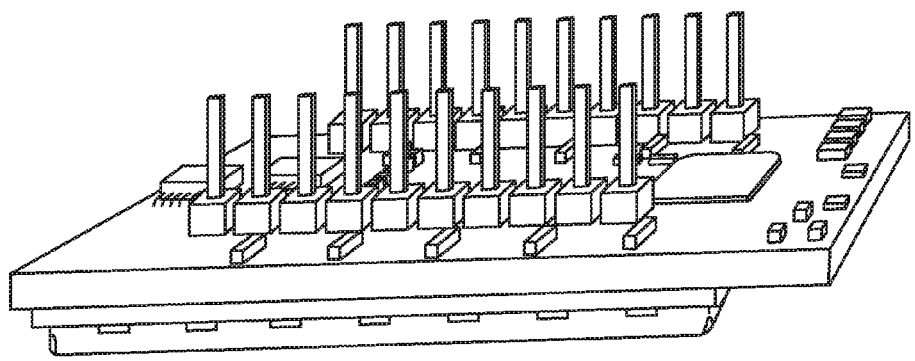
Figure 13F:
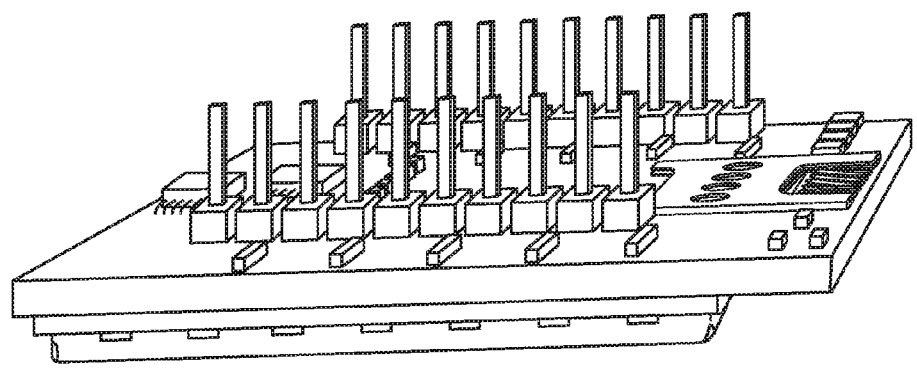
Figure 11G:
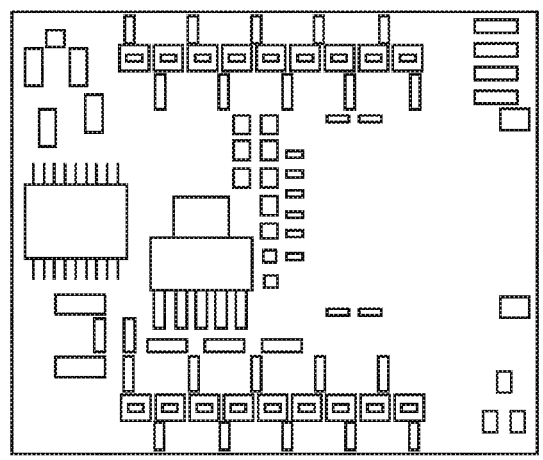
Figure 12G:
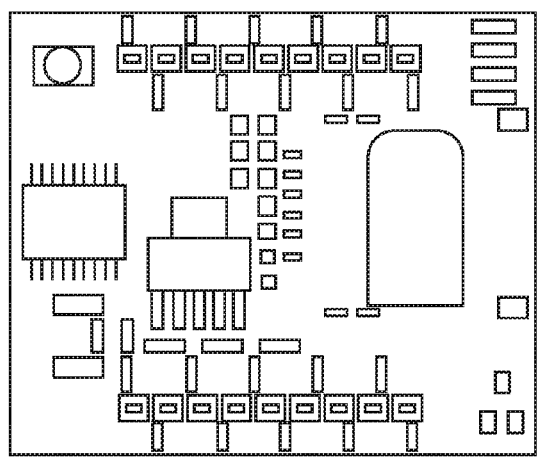
Figure 13G:
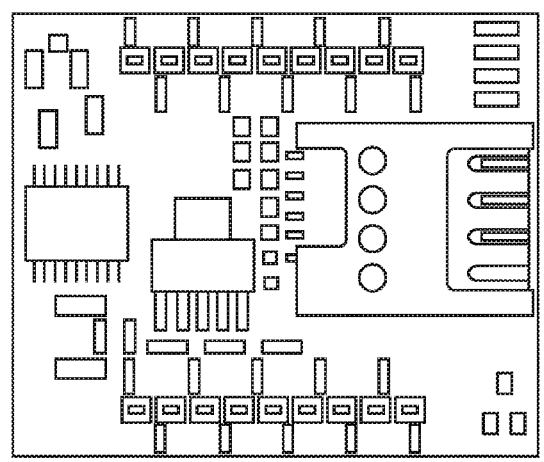

FIG. 10 is a mechanical drawing of PC board 102 of a GSM-GPRS modem 100 showing locations of connectors. Such a drawing may be used to assist a designer in knowing where to align mating connectors on their baseboard as well as physical routing of RF cables inside their end product.

Embodiments of embedded cellular modems configured for a CDMA network are depicted in FIGS. 11a to 11g; embodiments of embedded cellular modems configured for a CDMA EV-DO network are depicted in FIGS. 12a to 12g; and embodiments of embedded cellular modems configured for a GSM GPRS network are depicted in FIGS. 13a to 13g.

Embodiments of the invention may also comprise an LTE-capable modem 100.

As is evident from the above-described figures, embodiments of the invention provide a number of unique features and benefits. The space-efficient size of embedded cellular modem 100 is enabled by the use of surface mount connectors to meet XBee pinout requirements while freeing up surface area on a topside of the modem and its PC board. The use of solder-masked vias support high-volume manufacturing of small geometry board features under BGA components. Further, the use of a micro-SIM card slot on an XBee-sized board provides unique advantages over known modems.

PCB panel design using a combination of scored edges and routed edges supports low cost, high volume PCB manufacturing and subsequent module assembly. Further, the multi-layer stackup approach not only minimizes size and cost, but also maximizes RF performance, such as minimizing signal loss and improving RX sensitivity.

GPS and GLONASS positioning support in an XBee-sized board is also unique, as is the ability to support antenna diversity in an XBee form factor.

In addition to the advantages offered by embodiments of embedded cellular modem 100 as described above, embodiments of the invention also include a cellular modem kit.

Figure 14:
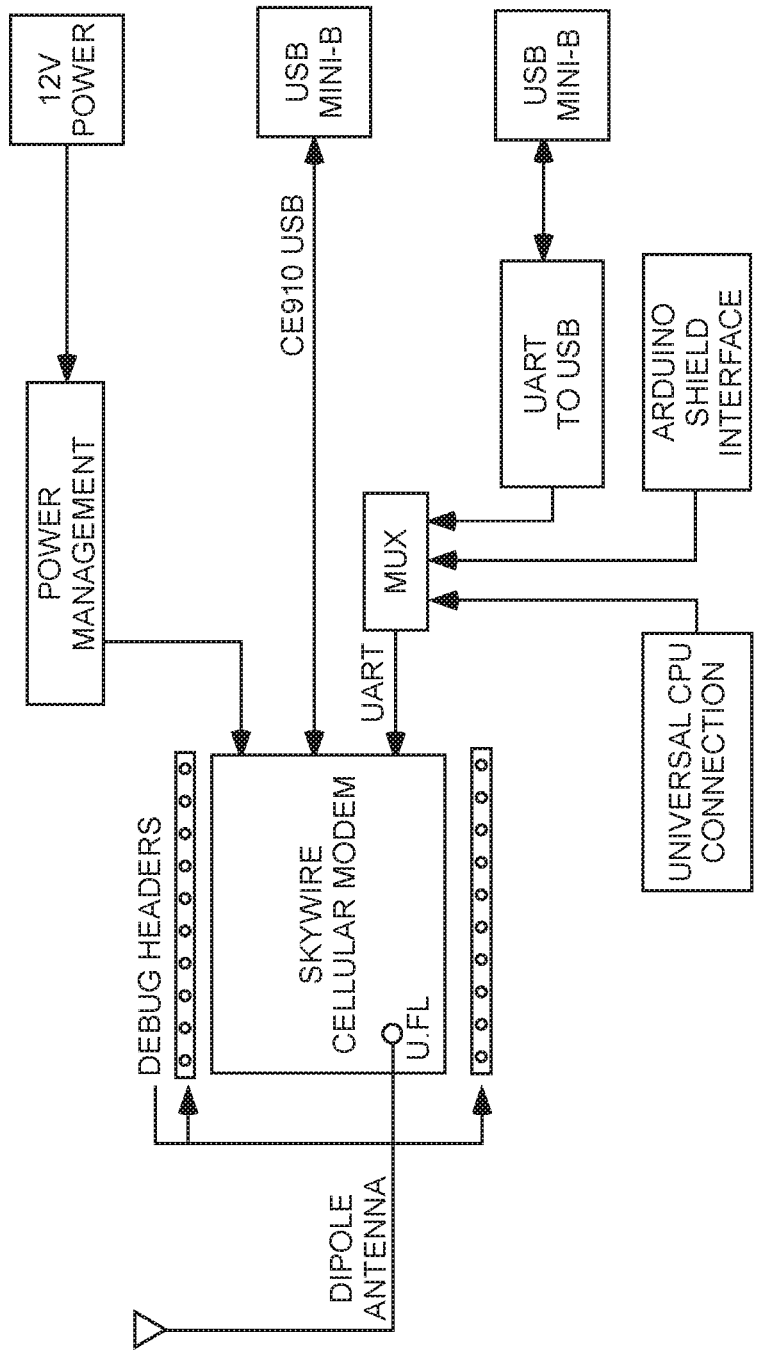
FIG. 14 depicts a development kit, according to an embodiment of the invention.
Figure 15:
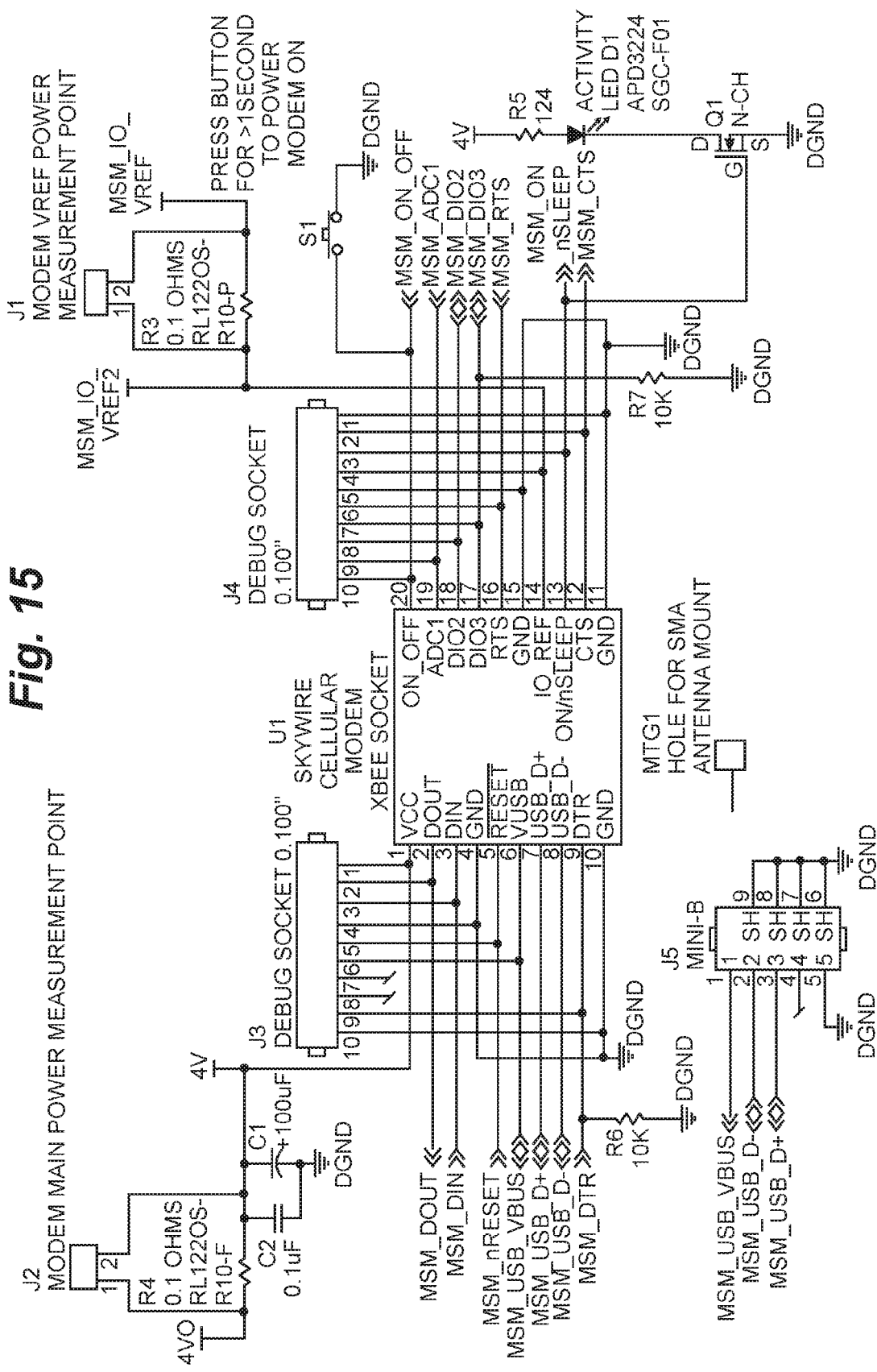
FIGS. 15-19 depict electrical schematics of the development kit of FIG. 14.
Figure 16:
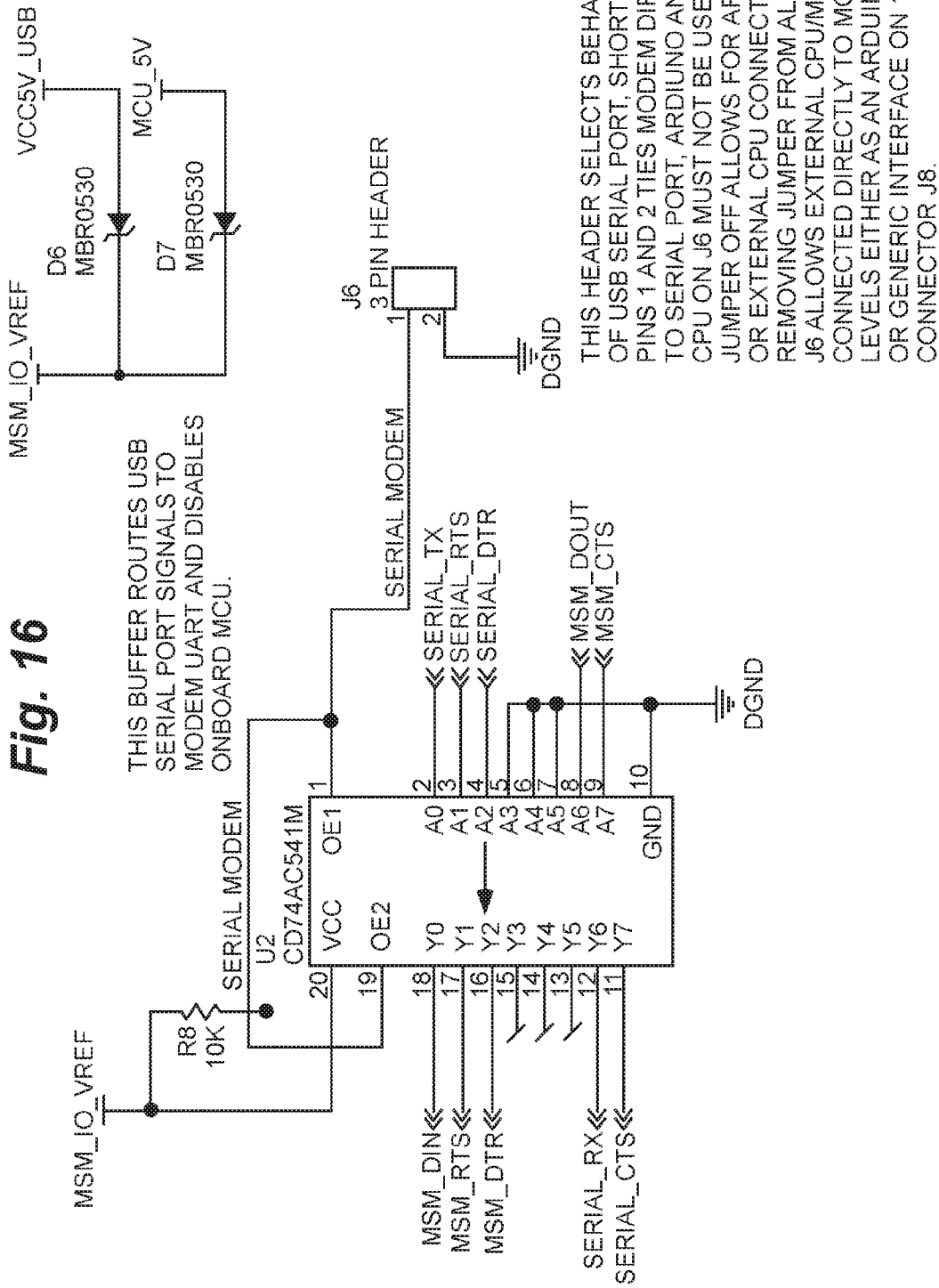
Figure 17:
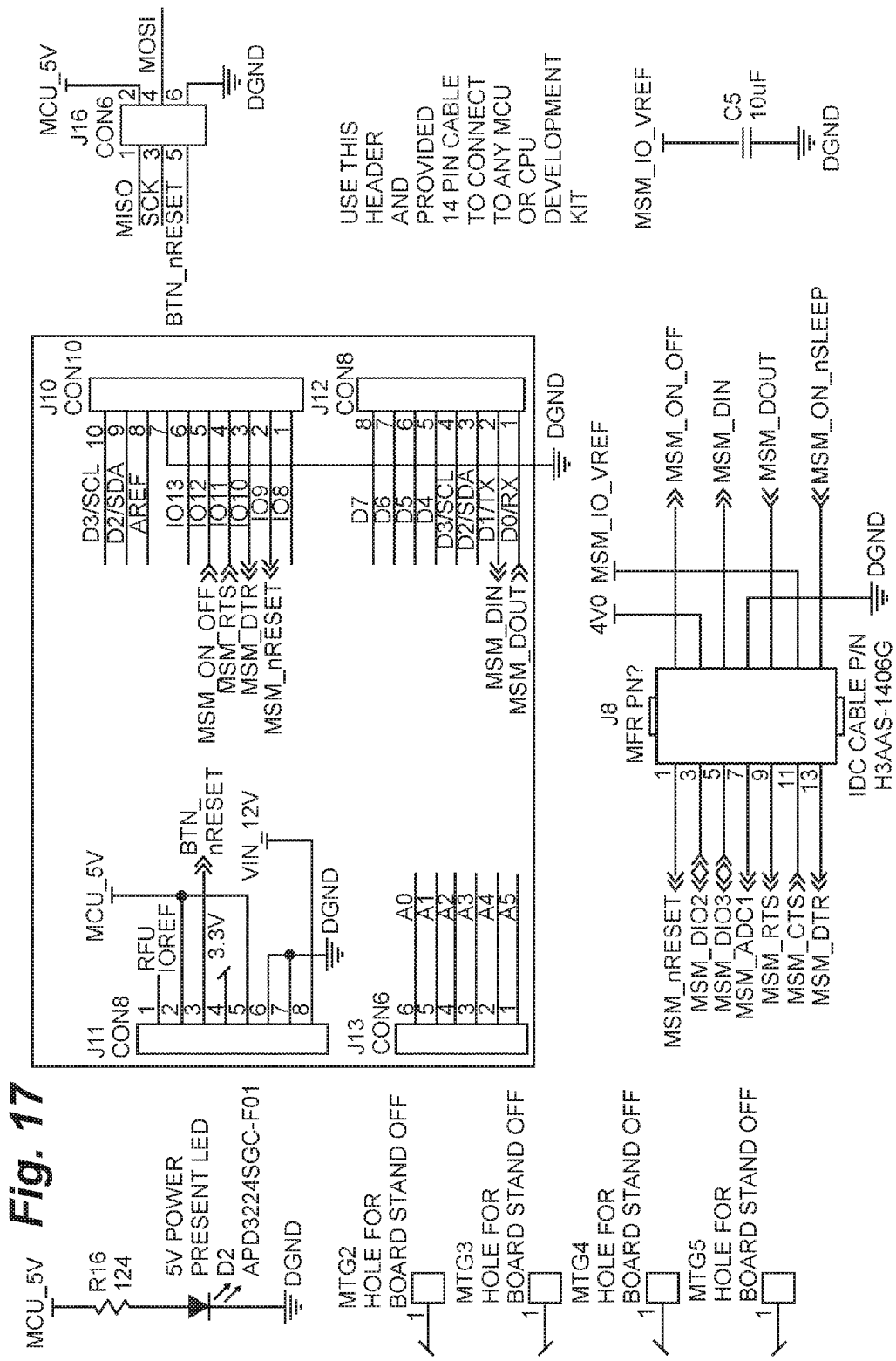
Figure 18:
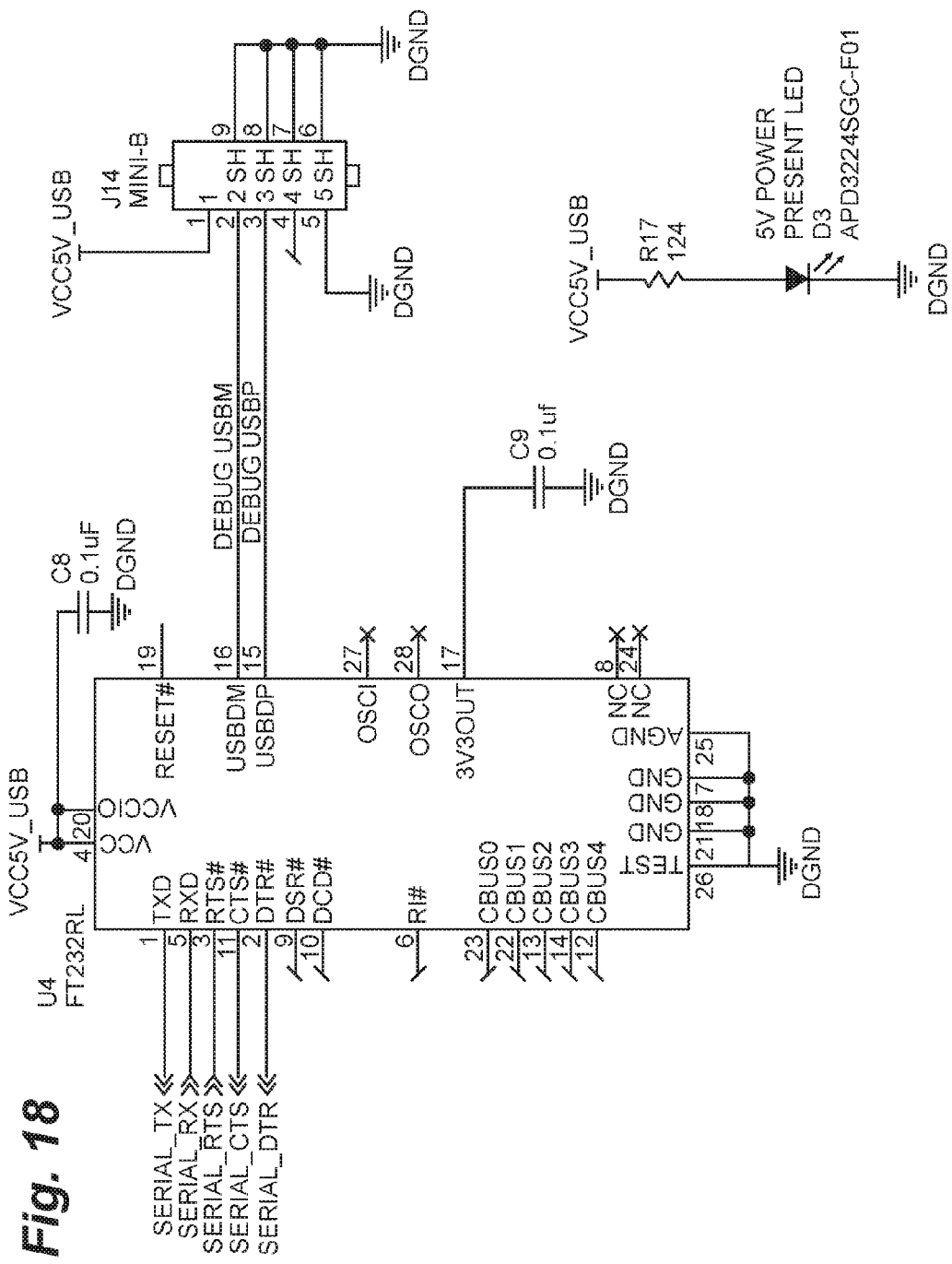
Figure 19:
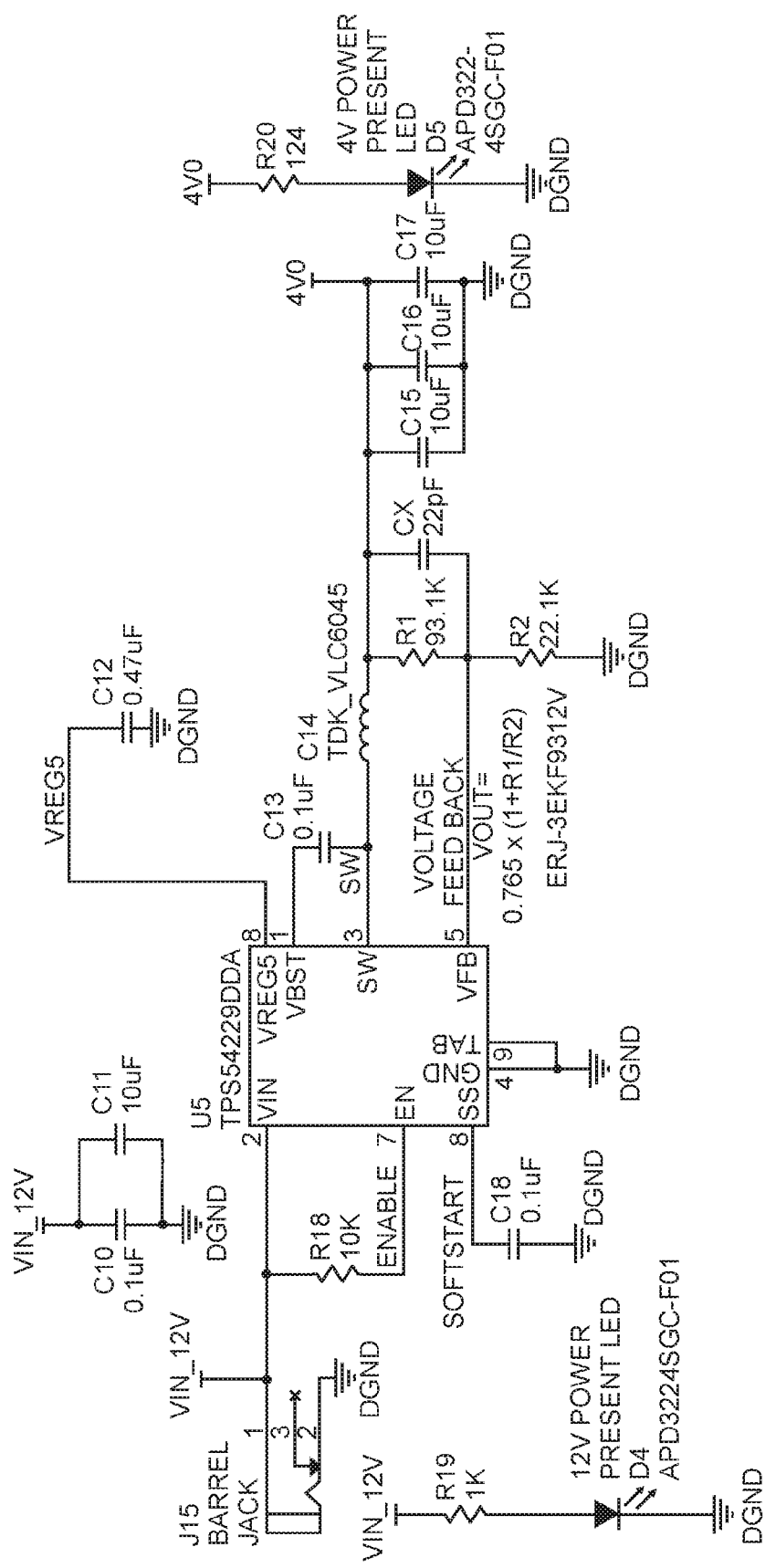

Referring to FIG. 14, a block diagram of an assembled development kit is depicted. In an embodiment, the kit includes cellular modem 100 with debugging headers, power management electronics supplied by a power source (depicted as a 12V source). Other components include a USB Mini-B connected to modem 100, another USB Mini-B interfacing with a MUX via a UART to USB interface, an universal CPU connection, and an Arduino Shield interface.

Details of the block diagram are further depicted and described in the schematic diagrams of FIGS. 15-19.

Embodiments of the invention also include algorithms for sending SMS messages using embedded cellular modem 100.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed:

1. A space-efficient cellular modem device for machine-to-machine communications, the modem device comprising:
    a multi-layer printed circuit board defining a top side and a bottom side and including a first circuit layer adjacent the top side, a second circuit layer adjacent the bottom side, a ground plane layer, and a power plane layer, the ground and power plane layers located between the first and second circuit layers;
    a cellular transceiver module configured to communicate over a cellular wireless cellular network, the cellular transceiver module comprising a processor and attached to a top side of the multi-layer printed circuit board;
    electrical power-management components attached to the multi-layer printed circuit board, the power-management components in electrical communication with the cellular transceiver module;
    a first plurality of electrically-conductive pins in electrical connection with the cellular transceiver module and aligned along a first pin axis to form a first row of pins, each of the first plurality of pins extending outwardly and away from the bottom side of the multi-layer printed circuit board;
        a second plurality of electrically-conductive pins in electrical connection with the cellular transceiver module and aligned along a second pin axis to form a second row of pins, each of the second plurality of pins extending outwardly and away from the bottom side of the multi-layer printed circuit board, the second row of pins located opposite the first row of pins; and
    a communications port in electrical communication with the cellular transceiver module, the communications port configured to receive and transmit communication signals over the cellular wireless network.

2. The cellular modem device of claim 1, wherein the cellular wireless cellular network is a CDMA network or a GSM network.

3. The cellular modem device of claim 1, wherein the communications port comprises an antenna port, and the cellular modem further comprises an antenna.

4. The cellular modem device of claim 1, wherein each of the first plurality of pins and the second plurality of pins consists of ten pins.

5. The cellular modem device of claim 1, wherein the modem device conforms to an XBee form factor.

6. The cellular modem device of claim 1, wherein a length of the cellular modem device does not exceed 40 mm and the width of the cellular modem device does not exceed 35 mm.

7. The cellular modem device of claim 6, wherein the length does not exceed 34 mm and the width does not exceed 29 mm.

8. The cellular modem device of claim 1, wherein the layers of the printed circuit board are electrically connected via inter-layer vias.

9. The cellular modem device of claim 1, further comprising a micro-SIM card slot.

10. A space-efficient cellular modem device for machine-to-machine communications, the modem device comprising:
    a multi-layer printed circuit board defining a top side and a bottom side and including a circuit layer, a ground plane layer and a power plane layer, the top side of the multi-layer printed circuit board defining a top-side surface area;

a cellular transceiver module configured to communicate over a cellular wireless cellular network, the cellular transceiver module comprising a housing defining a top-side surface area and attached to a top side of the multi-layer printed circuit board, the top-side surface area of the cellular transceiver module being in a range of 50% to 100% of the top-side surface area of the multi-layer printed circuit board;

electrical power-management components attached to the multi-layer printed circuit board, the power-management components in electrical communication with the cellular transceiver module;

a first row of electrically-conductive pins in electrical connection with the cellular transceiver module, each of the pins extending outwardly and away from the bottom side of the multi-layer printed circuit board;

a second row of electrically-conductive pins in electrical connection with the cellular transceiver module, each of the pins extending outwardly and away from the bottom side of the multi-layer printed circuit board;

an antenna port in electrical communication with the cellular transceiver module, the communications port configured to receive and transmit communication signals over the cellular wireless network.

11. The cellular modem device of claim 10, further comprising an antenna connected to the antenna port.

12. The cellular modem device of claim 10, wherein the cellular wireless cellular network is a CDMA network or a GSM network.

13. The cellular modem device of claim 10, further comprising a mini-USB interface.

14. The cellular modem device of claim 10, wherein each of the first row of pins and the second row of pins consists of ten pins.

15. The cellular modem device of claim 10, wherein the modem device conforms to an XBee form factor.

16. The cellular modem device of claim 10, wherein a length of the cellular modem device does not exceed 40 mm and the width of the cellular modem device does not exceed 35 mm.

17. The cellular modem device of claim 16, wherein the length does not exceed 34 mm and the width does not exceed 29 mm.

18. The cellular modem device of claim 10, wherein the layers of the printed circuit board are electrically connected via inter-layer vias.

19. The cellular modem device of claim 10, further comprising a micro-SIM card slot.

20. The cellular modem device of claim 10, wherein a height of the multi-layer printed circuit board does not exceed 0.07 inches.

* * * * *